US010026329B2

(12) United States Patent
Ferro (10) Patent No.: US 10,026,329 B2
(45) Date of Patent: Jul. 17, 2018

(54) INTRALINGUAL SUPERTITLING IN LANGUAGE ACQUISITION (71) Applicant: ISSLA Enterprises, LLC, Hull, MA (US)

(72) Inventor: John W. Ferro, Hull, MA (US)

(73) Assignee: ISSLA Enterprises, LLC, Hull, MA (US)

( * ) Notice: Subject to any disclaimer, the term of this patent is extended or adjusted under 35 U.S.C. 154(b) by 572 days.

(21) Appl. No.: 14/090,988

(22) Filed: Nov. 26, 2013

(65) Prior Publication Data

US 2014/0147816 A1  May 29, 2014

Related U.S. Application Data (60) Provisional application No. 61/729,784, filed on Nov. 26, 2012.

(51) Int. Cl.
G09B 5/06 (2006.01)

(52) U.S. Cl.
CPC ..................... G09B 5/065 (2013.01)

(58) Field of Classification Search
CPC ........................................ G09B 5/065
USPC ........................................... 434/157
See application file for complete search history.

(56) References Cited

U.S. PATENT DOCUMENTS

| 5,766,015 A | 6/1998 | Shpiro |
| 2007/0015121 A1 | 1/2007 | Johnson et al. |
| 2008/0033721 A1* | 2/2008 | Dittrich ............. G06F 17/30056 704/235 |
| 2008/0109208 A1* | 5/2008 | Curry et al. ...................... 704/3 |
| 2011/0179180 A1* | 7/2011 | Schleifer ............. H04L 12/1818 709/227 |
| 2011/0307255 A1* | 12/2011 | Frazier et al. ................. 704/235 |
| 2012/0214141 A1 | 8/2012 | Raya et al. |

FOREIGN PATENT DOCUMENTS

| EP | 0360909 B1 | 12/1994 |
| EP | 2444948 A1 | 4/2012 |

OTHER PUBLICATIONS

Deborah Cordier, "Speech recognition software for language learning: Toward an evaluation of validity and student perceptions," University of South Florida Graduate School Theses and Dissertations, (Jul. 14, 2009).
The National Center for Technology Innovation,"Speech Recognition for Learning," http://www.brainline.org/content/2010/12/speech-recognition-for-learning_pageall.html, (2010).

(Continued)

Primary Examiner — Robert P Bullington
(74) Attorney, Agent, or Firm — BainwoodHuang (57) ABSTRACT A technique for facilitating language instruction employs speech recognition technology to convert spoken content from a teacher in a target language to corresponding text in the target language, substantially in real time, and to project the converted text for viewing by the students. Students are thus able both to hear the spoken content from the teacher and to see the corresponding text, thus enjoying a multi-sensory, intralingual language learning experience that combines both listening and reading.

14 Claims, 6 Drawing Sheets (56) References Cited

OTHER PUBLICATIONS

Maxine Eskenazi, "Using Automatic Speech Processing for Foreign Language Pronunciation Tutoring: Some Issues and a Prototype," Language Learning & Technology 2:2 pp. 62-74 (1999).
Liberated Learning Consortium, Real Time Captioning, http://liberatedlearning.com/?page_id=111, downloaded on Aug. 4, 2015.

* cited by examiner

INTRALINGUAL SUPERTITLING IN LANGUAGE ACQUISITION

This application claims the benefit of U.S. Provisional Application No. 61/729,784, filed Nov. 26, 2013, the contents and teachings of which are incorporated by reference herein in their entirety.

BACKGROUND

Language instruction commonly takes place in a classroom in which a teacher administers lessons to students. Lessons may cover the basic skills of listening, speaking, reading, and writing in the language to be learned, i.e., in the "target language."

Often, teachers will speak in class primarily in the target language, so that students can develop skills at listening to the sounds and structure of the target language and interpreting its meaning. Students may be expected to respond in kind, speaking primarily in the target language. Students are thus encouraged to develop their "ear" for the target language as they also build competence in their own oral production and pronunciation.

SUMMARY

Often, students can have trouble following a teacher in a target language. Some students are able to track the teacher's speech for short periods of time and may understand many words or phrases, but they have difficulty in understanding the sense and meaning of complete sentences or clauses. When a teacher is speaking in long sentences, students may concentrate so hard on understanding the later portions of a sentence that they may forget what was said at the beginning, such that the overall meaning of the sentence is lost. Although speaking to students in the target language certainly promotes language learning over time, this teaching approach could be much more effective if the teacher's spoken content could be made less ephemeral.

In contrast with prior approaches to teaching language, an improved technique for facilitating language instruction employs speech recognition technology to convert spoken content from a teacher in a target language to corresponding text in the target language, substantially in real time, and to project the converted text for viewing by the students. Students are able both to hear the spoken content from the teacher and to see the corresponding text, thus enjoying a multi-sensory, intralingual language learning experience that combines both listening and reading. This multi-sensory experience also operates to persist the teacher's speech, such that students can refer back to spoken content in textual form, prompting the students to remember what the teacher has already said and assisting them in parsing long and/or complicated sentences.

In some examples, the improved technique stores converted text from the teacher's spoken content in a transcript, which retains a written record of the teacher's speech acquired over the course of a teaching session. The transcript can be distributed to students to enable them to review the content of the lesson and thus to further burnish their language skills.

In some examples, speech recognition technology also converts student-based spoken content in the target language to student-based text, substantially in real time as the students speak, with the student-based text stored in the transcript along with the converted text from the teacher. Students can thus receive a record of their own language production and use the record as a basis for measuring their own improvement.

In some examples, spoken content, from the teacher and/or students, is stored in text-embedded audio files. Such audio files record, in digital form, audio input carrying spoken content from the teacher and/or students and also corresponding text generated by the speech recognition technology. Such files may be played back on a computerized device to reproduce the audio input and to display the corresponding text in synchronization with the audio input as the audio is played back.

Certain embodiments are directed to a method of facilitating teaching of a target language. The method includes receiving, by a microphone, a stream of speech spoken in the target language into the microphone and to multiple students. The method further includes converting, by a computerized device coupled to the microphone, the stream of speech into a corresponding stream of text in the target language. The method still further includes projecting the converted stream of text in the target language to the students to enable the students contemporaneously to hear the speech in the target language and to see the corresponding text in the target language, thereby providing a multi-sensory language learning experience for facilitating teaching of the target language to the students.

Other embodiments are directed to a method of facilitating teaching of a target language. The method includes receiving, by a microphone, a stream of speech spoken by a teacher in the target language into the microphone and to multiple students and converting, by a computerized device coupled to the microphone, the stream of spoken speech into a corresponding stream of teacher text in the target language. The method further includes receiving streams of speech spoken in the target language from the students and converting the streams of speech from the students into corresponding streams of student text in the target language. The method still further includes projecting the stream of teacher text and the streams of student text together to enable the students contemporaneously to hear spoken speech in the target language and to see corresponding text in the target language, thereby providing a multi-sensory language learning experience for facilitating teaching of the target language to the students.

Further embodiments are directed to an apparatus constructed and arranged to perform the method described above. Still other embodiments are directed to a computer program product. The computer program product stores instructions, which when executed on one or more processing units of a computerized apparatus, cause the computerized apparatus to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for facilitating language instruction employs speech recognition technology to convert spoken content from a teacher in a target language to corresponding text in the target language, substantially in real time, and to project the converted text for viewing by the students. Students are thus able both to hear the spoken content from the teacher and to see the corresponding text, thus enjoying a multi-sensory, intralingual, language learning experience that combines both listening and reading.

Figure 1:
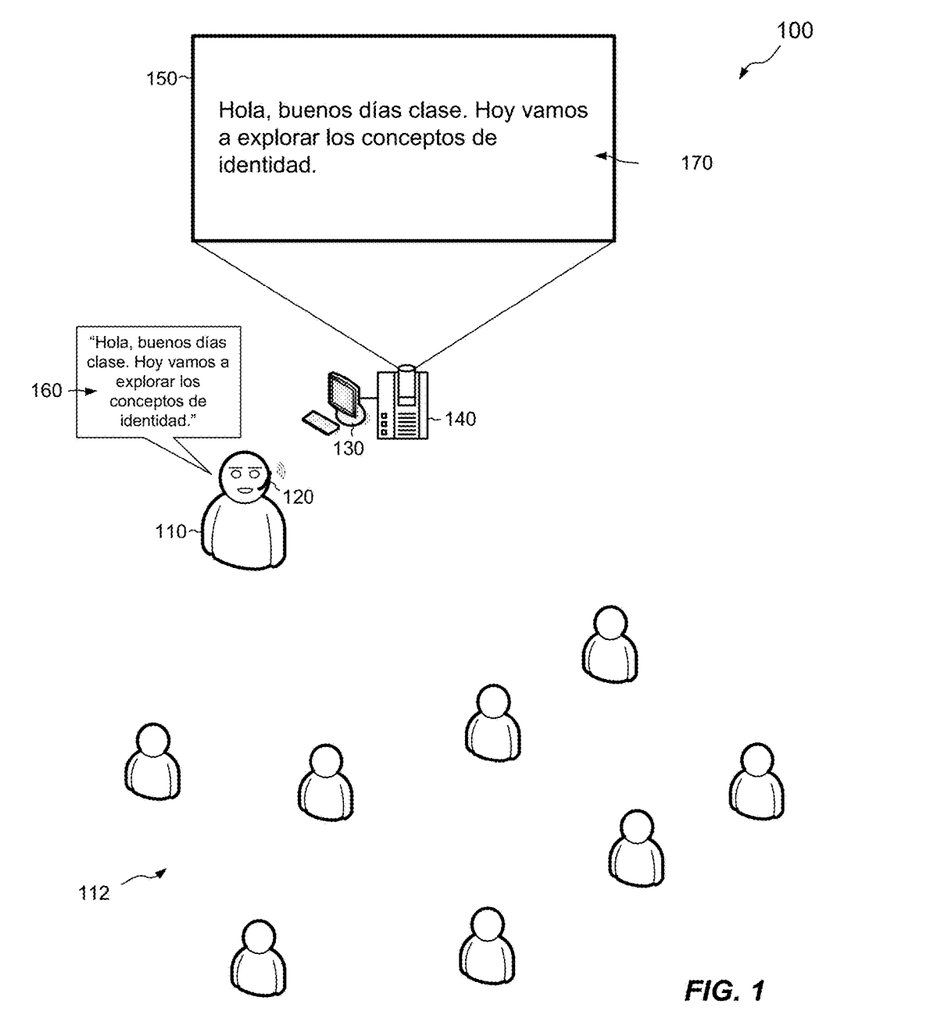
FIG. 1 is a simplified schematic view of an example classroom environment in which embodiments of the invention hereof can be practiced.

FIG. 1 shows an example classroom environment 100 in which embodiments of the improved technique hereof can be practiced. Here, a teacher 110 administers a language lesson to multiple students 112. The teacher 110 carries, wears, or otherwise has access to a microphone 120. The microphone 120 is operatively connected to a computerized device 130, and the computerized device 130 is operatively connected to a projector 140. The computerized device 130 runs a speech recognition engine for realizing speech recognition technology, and the projector 140 projects images generated on the computerized device 130 onto a screen 150. The screen 150 may be located in the classroom above the head of the teacher 110 or in some other location easily viewable by the students 112.

The microphone 112, computerized device 130, projector 140, and screen 150 can be realized with any suitable technologies. For example, the microphone 120 can be a wired microphone connected to an input jack on the computerized device 130 via a cable. Alternatively, the microphone can be provided as a wireless device (e.g., a Bluetooth device) that is mated with the computerized device 130 to convey the voice of the teacher to the computerized device 130 wirelessly. Further, the microphone may be provided internally within the computerized device 130. The computerized device 130 itself may be implemented as a desktop computer, server, laptop computer, tablet computer, smart phone, personal data assistant, or any other device capable of receiving audio input, running speech recognition software, and generating output that can be displayed to the students 112. The projector 140 can be implemented as an overhead projector, a ceiling-mounted projector, a desktop projector, or some other type of projector. In some examples, the screen 150 is provided as a passive screen that receives images from the projector 140 and displays the images to the students 112. In other examples, the projector 140 is omitted and the screen 150 is provided as an active screen, which receives image signals or data from the computerized device 130 and displays images to the students 112 directly. For example, the screen 150 may be a large computer monitor, a television display, or some other display device. Preferably, the text displayed on the screen 150 is large enough to be read by the students 112 from their normal seating positions, and the screen 150 itself is large enough to display multiple lines of text.

In example operation, the teacher 110 produces a stream of speech 160 (i.e., talks) to the students 112 and into the microphone 120 in the target language. The students 112 hear the teacher's speech 160, and the microphone 120 converts the teacher's speech 160 into electronic signals and transmits the signals (e.g., by wire or wirelessly) to the computerized device 130. The computerized device 130 receives the signals carrying the teacher's speech 160 and provides the signals as input to the speech recognition engine. The speech recognition engine converts the signals carrying the teacher's speech 160 to corresponding text 170, intralingually (i.e., in the same language) and substantially as the teacher speaks. The computerized device 130 then outputs the text 170 corresponding to the teacher's speech 160 to the projector 140. The projector 140 projects the text 170 onto the screen 150, which in turn projects the text 170 to the students 112. The teacher's speech is thus effectively subtitled, or in this case, "supertitled," i.e., displayed above the teacher for viewing by the students 112. Finite processing speed of the computerized device 130 may slightly delay the conversion of speech to text, resulting in a small measure of conversion latency. However, such latency is generally on the order of seconds or less, meaning that the speech recognition engine converts speech to text substantially in real time. Students 112 are thus able to read a textual version of the teacher's speech at substantially the same time as they hear the teacher speaking. Students 112 thus enjoy a multi-sensory language acquisition experience, as they are able to process the teacher's speech based both on what they hear and on what they read, enhancing comprehension and providing a real-time written record. Students 112 can alternately attend to the teacher 110 and to the screen 150, to prompt their memories concerning earlier-spoken content, to check the spelling of words, to decipher unfamiliar phrases, and generally to reinforce connections between spoken utterances and written text.

The teacher's speech need not be based on any prepared script or written passage. To the contrary, the teacher's speech may be spontaneous and may cover any subject or conversation. The disclosed technique is thus content-independent, working equally well with any content. Whatever the teacher 110 says is converted to text and projected to students, limited only by the capabilities of the speech recognition engine. As is known, speech recognition software can be trained to improve its conversion accuracy when presented with particular voices and can be programmed to recognize new words and phrases. Thus, teachers and/or students can remove limitations in convertible content through training.

The speech recognition engine may invariably make conversion errors, which errors may be attributable to the speaker, to the software, or to both. Software errors can be improved through known methods of software training. However, speaker errors can also be improved through training. In an example, when the teacher speaks a word or phrase which the speech conversion engine converts incorrectly, the teacher has the option to repeat the word or phrase any number of times, adjusting his or her diction and/or accent until the speech recognition engine converts the word or phrase without error. Errors in speech recognition can thus be turned into teaching opportunities.

In some examples, output from the speech recognition engine is stored in a transcript, which may be accessed later by the teacher 110 and/or by the students 112. In a simple implementation, the speech recognition engine operates in conjunction with a word processing program that also runs on the computerized device 130. The teacher 110 opens a document in the word processing program and begins a language teaching session. As the teacher 110 speaks into the microphone 120, the speech recognition engine converts the teacher's speech to text and feeds the text into the word processing document. The document is thus made to accumulate the transcript of the language teaching session and may itself serve as the source of the text displayed on the screen 150 (e.g., the projector 140 may display images of the open word processing document on the screen 150). In another example, the computerized device 130 runs a program specially designed to capture speech from teaching sessions and store corresponding text in respective transcripts. The program may perform other functions, including recording audio to capture the teacher's speech and synchronizing the recorded audio with converted text. The program may store audio and corresponding text together in text-embedded audio files. When a user later opens a text-embedded audio file, the program plays back the audio and displays the corresponding text in synchronization with the audio, to allow a user to listen to the spoken content while reading the corresponding textual version generated by the text-to-speech engine.

Figure 2:
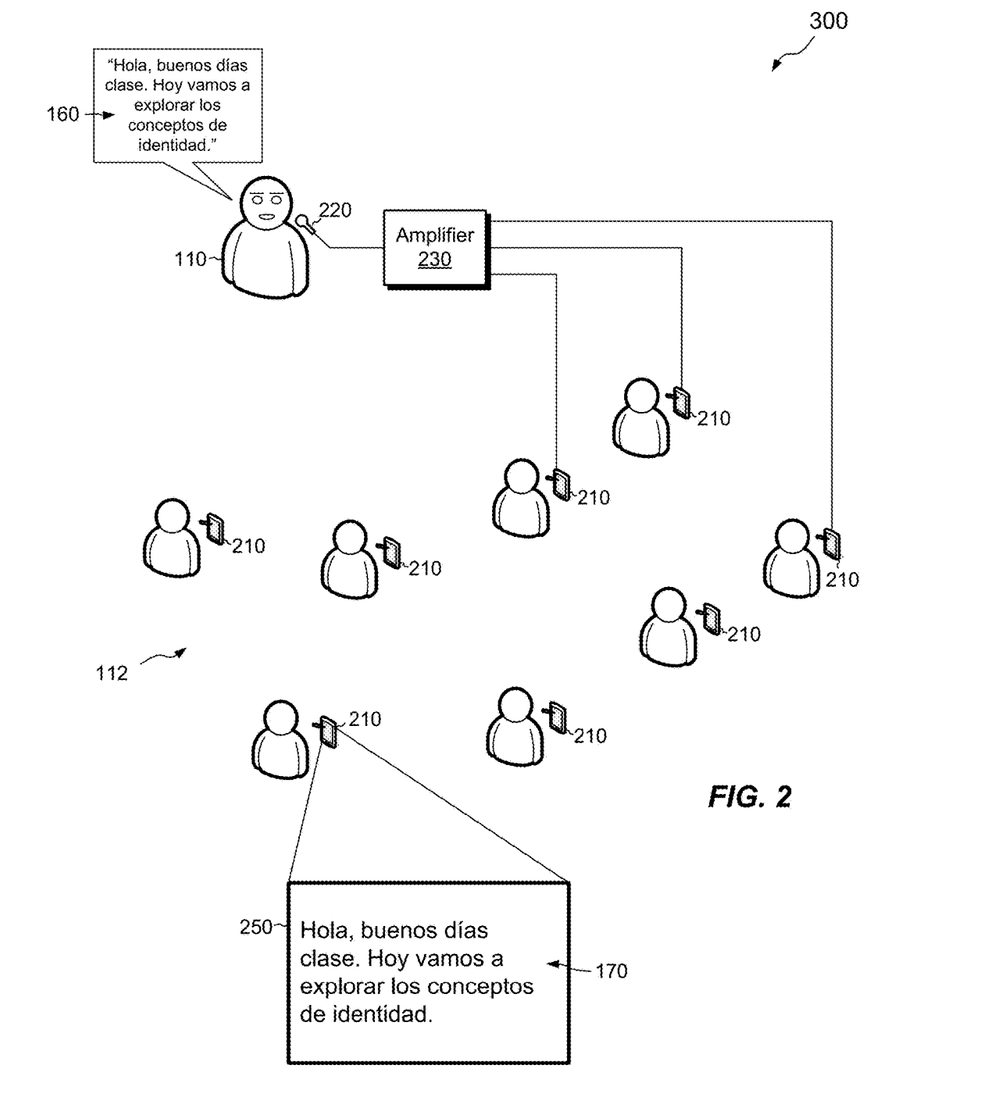
FIG. 2 is a simplified schematic view of another example classroom environment in which embodiments of the invention hereof can be practiced.

FIG. 2 shows an example classroom environment 200 in which embodiments of the improved technique hereof can be practiced. The environment 200 may be similar to the environment 100. In this example, however, no computerized device 130, projector 140, or screen 150 is provided; rather, the students are equipped with computing devices 210 that run speech recognition engines. The computing devices 210 may be implemented in any suitable form, such as with desktop computers, servers, laptop computers, tablet computers, smart phones, or personal data assistants, for example. Different computing devices 210 may be implemented differently. In a particular example, the computing devices are all tablet computers. A computing device 210 may be provided for each student 112, or students may share computing devices. In an example, the teacher 110 has a microphone 220 connected to an amplifier 230. The amplifier 230 amplifies the teacher's speech 160. The amplifier 230 is connected to each of the computing devices 210 for conveying the teacher's speech 160 to the respective devices (only some connections are shown for simplicity). Speech recognition engines running on the computing devices 210 convert the teacher's speech 160 to text, and display units (e.g., touchscreens) on the computing devices 210 project the converted text to the students directly. For example, a touchscreen on a computing device 210 displays a view 250 showing converted text from the teaching session.

Figure 3:
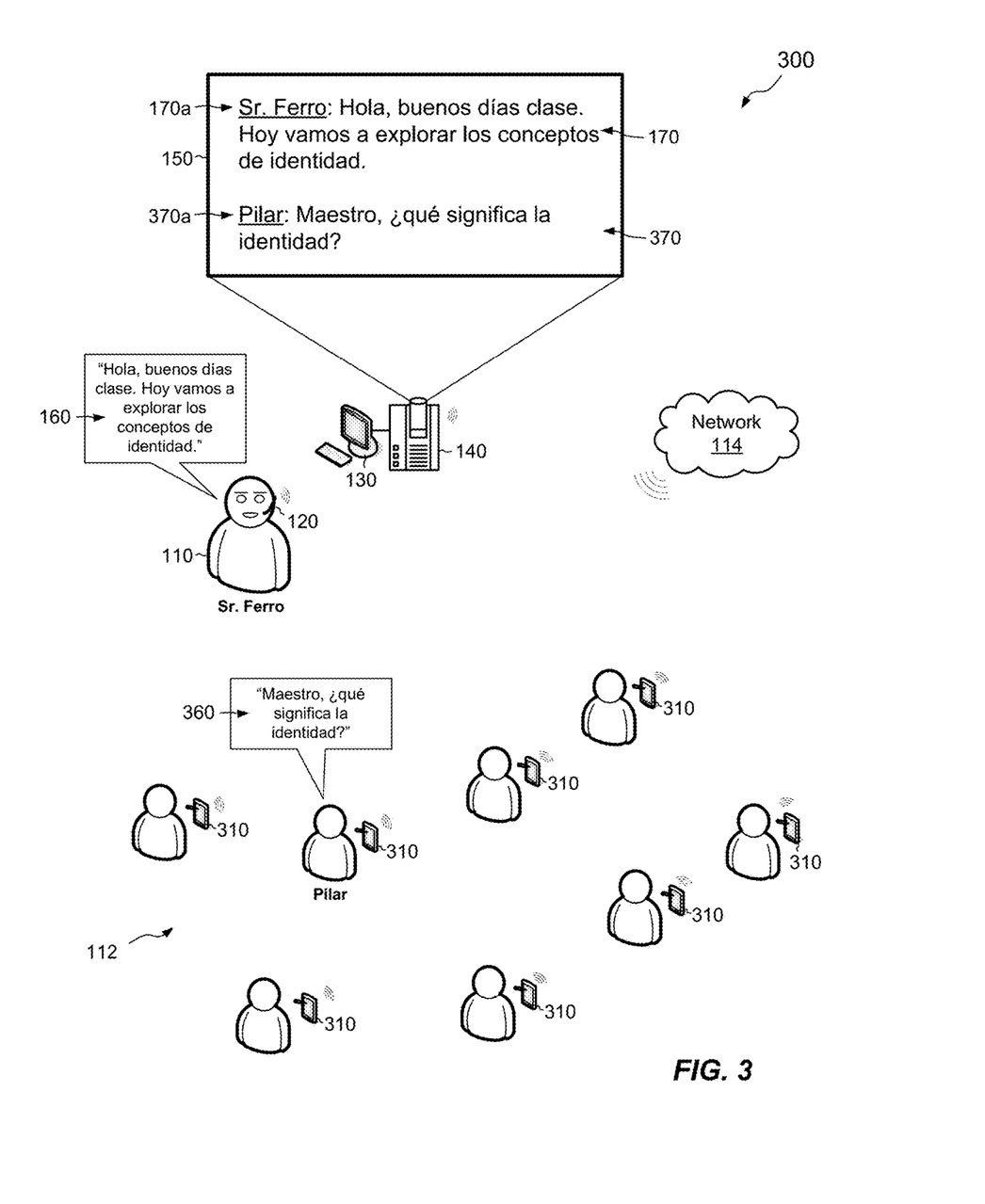
FIG. 3 is a simplified schematic view of yet another example classroom environment in which embodiments of the invention hereof can be practiced.

FIG. 3 shows an example classroom environment 200 in which embodiments of the improved technique hereof can be practiced. The environment 200 may be similar to the environment 100 except that the students 112 are provided with computing devices 310 and the computing devices 310 are operatively connected to the teacher's computerized device 130 over a network 114. The network 114 may be implemented as a wireless network, such as a Wi-Fi network, a wired network (such as Ethernet or Token Ring), or a combination of wireless and wired technologies. The computing devices 310 may be implemented in any suitable form, such as described above in connection with the computing devices 210 of FIG. 2. In a particular example, the computing devices 310 are all tablet computers each having a built-in microphone and running its own instance of a speech recognition engine. Students may each have their own computing devices 210, or students may share computing devices 210. In some examples, the computerized device 130 runs a server program (e.g., an interlingual supertitling, or "IS," server) as well as a client program (e.g., an interlingual supertitling, or "IS," client), and the computing devices 310 each run a respective instance of the IS client. In an alternative arrangement (not shown), the teacher 110 uses a computing device, like the computing devices 310 of the students 112, and the teacher's computing device runs an IS client, just like the student's devices. The computerized device 130 can then be configured as an IS server (without an IS client), with the teacher 110 and the students 112 all acting as clients to the common IS server. With either arrangement, speech in the target language not only from the teacher 110 but also from any of the students 112 can be converted to corresponding text in the target language and displayed on the screen 150.

In example operation, the teacher 110 starts the IS server on the computerized device 130 to initiate a teaching session. The teacher 110 also starts the IS client (on the device 130 or on his own device 310) and joins the teaching session by entering his name ("Sr. Ferro") and optional credentials, such as a password. The students 112 start their respective IS clients on their computing devices 310 and enter their names and (optionally) credentials. The teacher 110 may then start speaking in the target language, as described above. The teacher's speech recognition engine converts the teacher's speech 160 to text 170, and the IS client sends the text 170 to the IS server. The IS server then directs the projector 140 to project a textual version 170 of the teacher's speech 160. Here, however, there can be multiple persons speaking, so the IS server provides a label 170a displaying the teacher's name in connection with the text 170.

In an example, students may also speak in the target language and see their own speech displayed on the screen 150. For example, a student named "Pilar" may utter speech content 260 in the target language to the class and to the microphone built into her computing device 310. The speech recognition engine running on Pilar's computing device 210 receives signals from the microphone of Pilar's computing device 310 and converts the signals to corresponding text 370. The IS client running on Pilar's computing device 310 sends the text 370 to the IS server on the computerized apparatus 130, which then directs the projector 140 to project the text onto the screen 150. The text 370 includes a label 370a that identifies Pilar as the speaker. Using this approach, any of the students 112 can speak in the target language and see their speech displayed on the screen 150 in connection with their names. Students 112 may thus have conversations with the teacher 110, and with one another, with their speech converted to text and displayed on the screen 150.

In addition, the transcript may store all the content displayed on the screen 150 for later access. Thus, the transcript can be made to store converted speech from the teacher 110 as well as from any of the students 112. Further, the IS server and IS clients, working together, maintain audio content spoken by the teacher 110 and the students 112 in respective audio streams and associate the audio streams with respective streams of converted text. Text-embedded audio files can thus be generated that include speech from the teacher 110 as well as speech from the students 112.

In some examples, the IS clients and the IS server work together to display converted speech both on the screen 150 and on the computing devices 310. Thus, the students 112 can direct their attention to the screen 150 or to the displays on their own devices 310 to view the recently converted text. The IS clients may provide the students an option to save a separate copy of each lesson's transcript on their own computing devices 310.

In addition, with the arrangement of FIG. 3, students may correct their errors in diction and/or accent substantially as described above for the teacher. For example, students may repetitively speak incorrectly converted words or phrases and adjust their diction and/or accent as needed, until speech-to-text conversion errors are no longer made.

Figure 4:
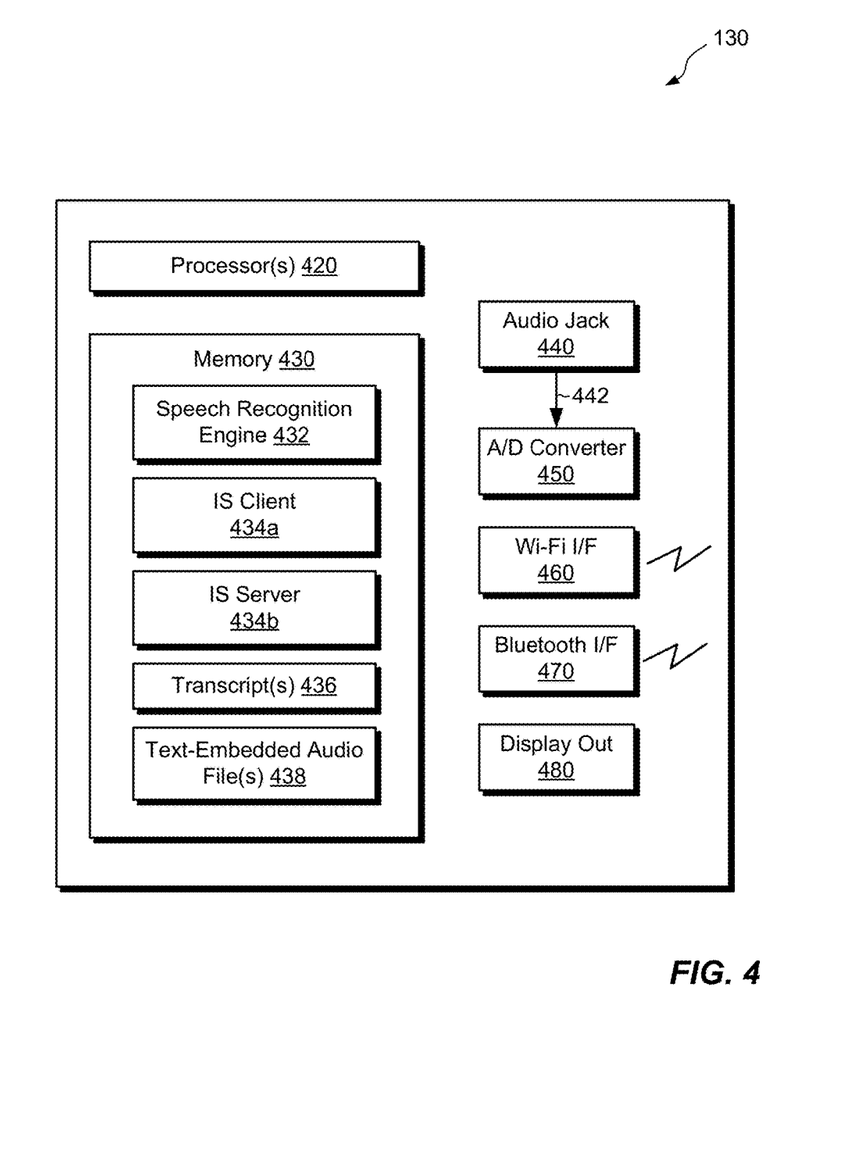
FIG. 4 is a block diagram of an example computerized device that can be used by a teacher in any of the environments of FIGS. 1 and 3.

FIG. 4 shows an example implementation of the computerized device 130 of FIGS. 1 and 3 in greater detail. Here, it is seen that the computerized device 130 includes a set of processors 420 (i.e., one or more processing chips and/or assemblies) and memory 430. The set of processors 420 and the memory 430 together form control circuitry, which is constructed and arranged to carry out various methods and functions as described herein. Also, the memory 430 includes a variety of software constructs realized in the form of executable instructions. When the executable instructions are run by the set of processors 420, the set of processors 420 are caused to carry out the operations of the software constructs. Although certain software constructs are specifically shown and described, it is understood that the memory 430 typically includes many other software constructs, which are not shown, such as an operating system and various applications, processes, and daemons.

The computerized device 130 is also seen to include an audio jack 440 (e.g., for connecting to an external microphone), an analog-to-digital converter 450 (e.g., for converting analog electronic signals 442 from the external microphone to digital values), a Wi-Fi interface 460, a Bluetooth Interface 470, and a display output port 480 (e.g., for connecting to the projector 140). Some of the features shown may be omitted in certain embodiments. For example, the Bluetooth interface may be omitted if only hardwired connections are used. Likewise, the audio jack 440 may be omitted if a Bluetooth microphone is used.

The memory 430 is seen to include the aforementioned speech recognition engine (432), IS client (434a), IS server (434b), one or more transcripts of language teaching sessions (436), and one or more text-embedded audio files (438). The IS client 434a and the IS server 434b may be omitted in some examples, such as in the environment 100 of FIG. 1.

Figure 5:
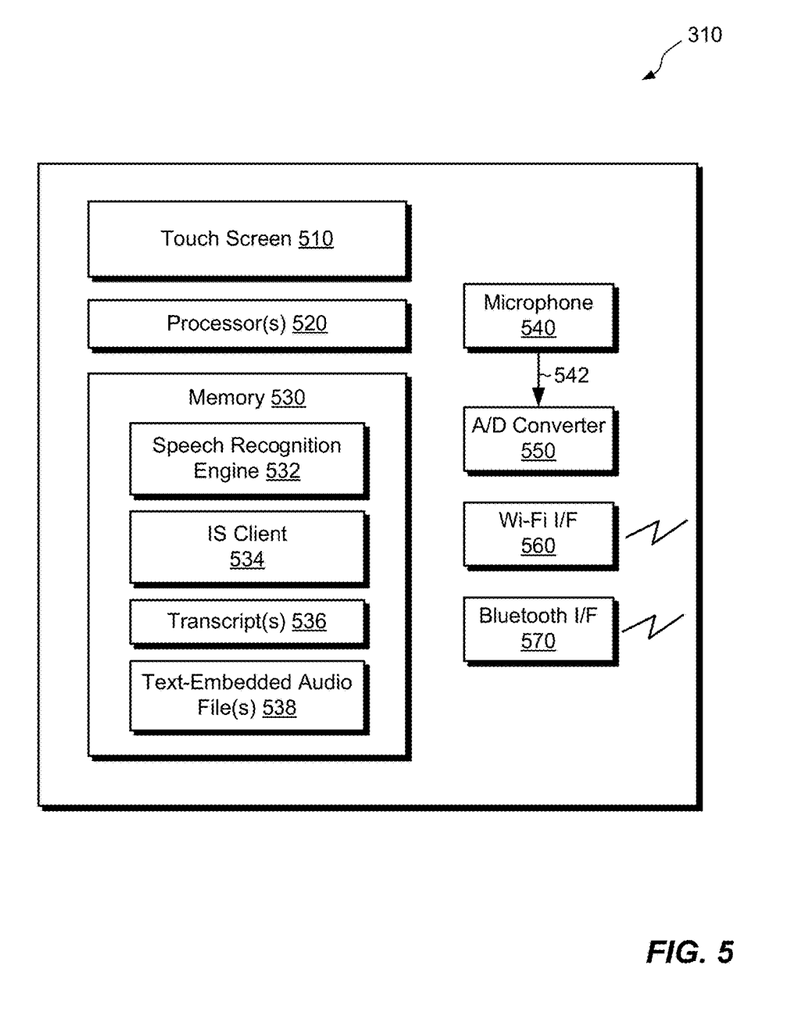
FIG. 5 is a block diagram of an example computing device that can be used by students in the environments of FIG. 3.

FIG. 5 shows an example implementation of the computing device 310 of FIG. 3 in greater detail. Here, it is seen that the computing device 310 includes a touchscreen 510, a set of processors 520 (i.e., one or more processing chips and/or assemblies) and memory 530. In a manner similar to that described above for the computerized apparatus 130, the set of processors 520 and the memory 530 of the computing device 310 together form client control circuitry, which is constructed and arranged to carry out various client methods and functions as described herein. Also, the memory 530 includes a variety of software constructs realized in the form of executable instructions. When the executable instructions are run by the set of processors 520, the set of processors 520 are caused to carry out the operations of the software constructs. It is understood that the memory 530 typically includes many other software constructs, which are not shown, such as an operating system and various applications, processes, and daemons. The computing device 310 is also seen to include a built-in microphone 540, an analog-to-digital converter 550 (e.g., for converting analog electronic signals 542 from the internal microphone 540 to digital values), a Wi-Fi interface 560, and a Bluetooth interface 570. Some of the features shown may be omitted in certain embodiments. For example, no internal microphone 540 is required in the classroom environment 200 of FIG. 2.

The memory 530 of the computing device 310 is seen to include the aforementioned speech recognition engine (532), IS client (534), one or more transcripts of language teaching sessions (536), and one or more text-embedded audio files (538).

Figure 6:
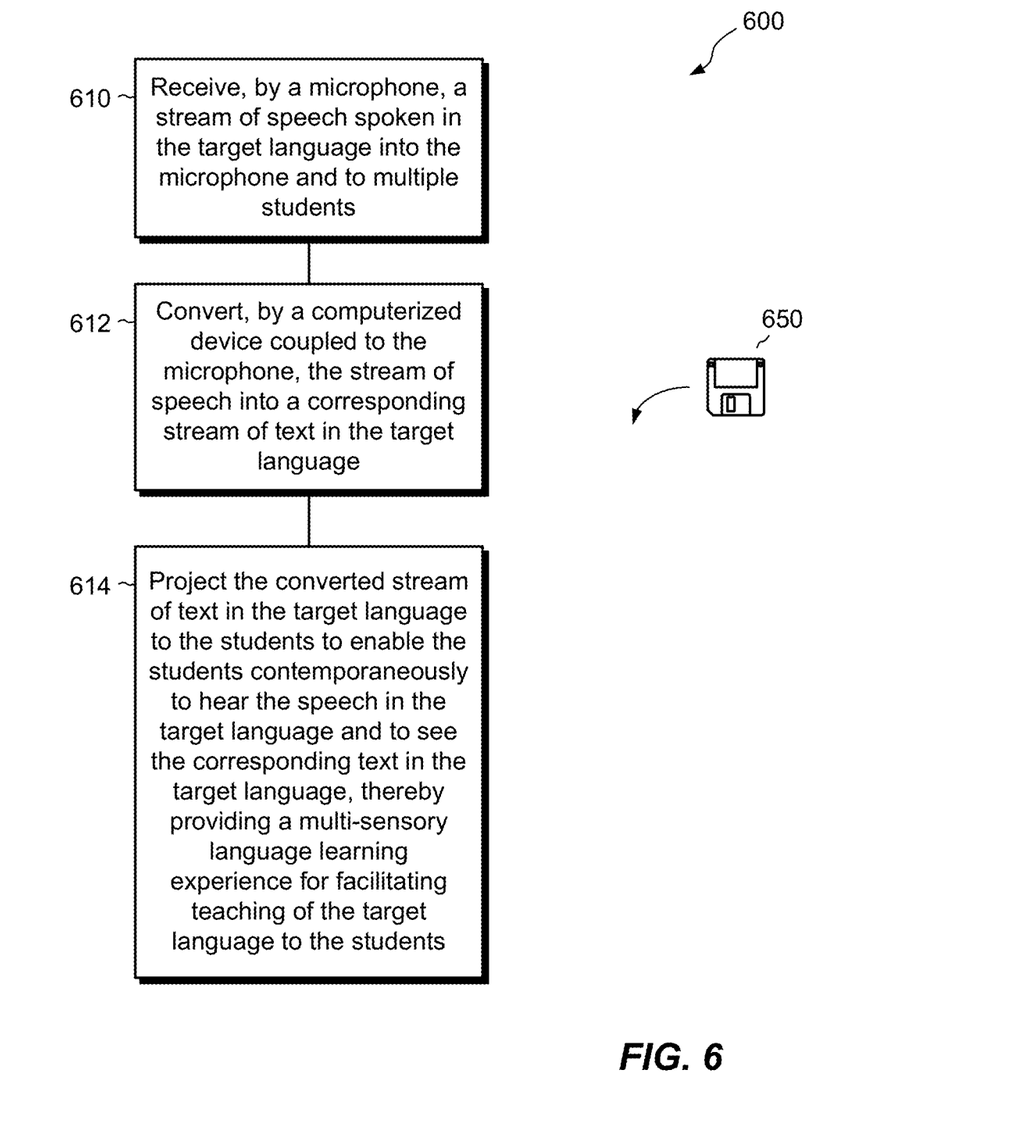
FIG. 6 is a flowchart showing an example method of facilitating teaching of a target language using any of the example environments of FIGS. 1-3.

FIG. 6 shows a process 600 for facilitating teaching of a target language. The process 600 may be carried out in connection with any of the classroom environments 100, 200, or 300. The process 600 is typically performed by the software constructs, described in connection with FIGS. 4 and/or 5, which reside in the memories 430 and/or 530 of the devices 130 and 310, respectively, and are run by the set of processors 420 and/or 520, respectively. The various acts of the process 600 may be ordered in any suitable way. Accordingly, embodiments may be constructed in which acts are performed in orders different from those illustrated, which may include performing some acts simultaneously, even though the acts are shown as sequential in the illustrated embodiments.

At step 610, a microphone receives a stream of speech spoken in the target language into the microphone and to multiple students. For example, the teacher 110 utters speech 160 into the microphone 120 (or 220) and to the students 112.

At step 612, the stream of speech is converted, by a computerized device coupled to the microphone, into a corresponding stream of text in the target language. For example, the speech recognition engine 432 running in the computerized device 130 coupled to the microphone 120 converts the stream of speech 160 into the corresponding stream of text 170. In another example, the speech recognition engine 542 running in the student computing devices 210 coupled to the microphone 220 (through the amplifier 230) convert the spoken speech 160 into corresponding text 170.

At step 614, the converted stream of text in the target language is projected to the students to enable the students contemporaneously to hear the speech in the target language and to see the corresponding text in the target language, thereby providing a multi-sensory language learning experience for facilitating teaching of the target language to the students. For example, the projector 140 projects images of the converted text onto the screen 150, which in turn projects the images to the students 112. In another example, the student computing devices 210 (or 310) project images of the converted text to the students directly.

An improved technique has been described for facilitating language instruction. The technique employs speech recognition technology to convert spoken content 160 from a teacher 110 in a target language to corresponding text 170 in the target language, substantially in real time, and to project the converted text 170 for viewing by the students 112. Students 112 are able both to hear the spoken content 160 from the teacher and to see the corresponding text 170, thus enjoying a multi-sensory, intralingual language learning experience that combines both listening and reading. This multi-sensory experience also operates to persist the teacher's speech, e.g., in a transcript 436, such that students can refer back to spoken content in textual form, prompting the students to remember what the teacher has said and assisting them in parsing long and/or complicated sentences.

Having described certain embodiments, numerous alternative embodiments or variations can be made. For example, although embodiments hereof have been presented for use in acquiring a target language, which is presumably a second language to the students 112, the embodiments taught herein may also be used by students in acquiring a first (primary) language. Further, the embodiments hereof may find useful application in any subject, whether it be language acquisition or something different. Indeed, the ability to capture and produce a written version of teacher remarks in real time (and to produce transcripts thereof) can be a tremendous help to students in any subject.

Also, embodiments have been shown and described in which speech is provided as a source of input; however, speech need not be the only source of input. For example, a teacher and/or students can use a keyboard or other input device for adding punctuation marks, numerals, or other text in line with spoken content. In some examples, a keyboard may be provided in the form of a small, hand-held device (e.g., a Bluetooth device) that includes only a few keys, such as keys for adding punctuation marks. A speaker can carry the device on his or her person and easily intersperse desired punctuation marks with spoken content, without being tethered to a keyboard or having to carry around a large device.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 650 in FIG. 6). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A computer-implemented method of facilitating teaching of a target language, comprising:

receiving, by a microphone, a stream of speech spoken by a teacher in the target language into the microphone and to students;

converting, by speech recognition software running on a computerized device coupled to the microphone, the stream of speech into a stream of text in the target language;

projecting, with a projecting device coupled to the computerized device, the stream of text in the target language to the students to enable the students to hear contemporaneously the stream of speech in the target language and to see the stream of text in the target language, thereby providing a multi-sensory language learning experience for facilitating teaching of the target language to the students;

generating, by the computerized device, a transcript of a language teaching session between the teacher and the students, the transcript including the stream of text accumulated over the language teaching session;

converting electrical signals carrying the stream of speech from the microphone to digital audio data, the digital audio data capturing, in digital form, the stream of speech; and storing the digital audio data together with the stream of text in a set of text-embedded audio files, the set of text-embedded audio files recording, in the digital form, the stream of speech synchronized with the stream of text, such that when the set of text-embedded audio files are played back, the set of text-embedded audio files reproduce the stream of speech and display the stream of text in synchronization with the stream of speech, wherein the method further comprises:

receiving student-generated speech in the target language, converting the student-generated speech into student text in the target language, and displaying the student text to the students to enable the students to see the student-generated speech in the target language contemporaneously with the students speaking in the target language, wherein generating the transcript includes storing the student text in the transcript, wherein displaying the student text to the students includes displaying, for each student whose speech is converted, a label that identifies a name of the student providing the student-generated speech.

2. The computer-implemented method as in claim 1, wherein, when projecting the stream of text in the target language, the stream of text is projected via a display screen set up in a classroom to enable the students in the classroom to view the stream of text.

3. The computer-implemented method as in claim 2, wherein the teacher administers the language teaching session within the classroom, and wherein, when projecting the stream of text in the target language, the display screen is set up in the classroom in a location above the teacher's head.

4. A method of facilitating teaching of a target language, comprising:

receiving, by a microphone, a stream of speech spoken by a teacher in the target language into the microphone and to students;

converting, by a computerized device coupled to the microphone, the stream of speech into a stream of text in the target language;

projecting the stream of text in the target language to the students to enable the students to hear contemporaneously the stream of speech in the target language and to see the stream of text in the target language, thereby providing a multi-sensory language learning experience for facilitating teaching of the target language to the students;

generating, by the computerized device, a transcript of a language teaching session between the teacher and the students, the transcript stored within a memory of the computerized device and including the stream of text accumulated over the language teaching session;

receiving student-generated speech in the target language, converting the student-generated speech into student text in the target language, and displaying the student text to the students to enable the students to see the student-generated speech in the target language contemporaneously with the students speaking in the target language, wherein generating the transcript includes storing the student text in the transcript, wherein receiving the student-generated speech involves the use of student microphones provided with student computing devices, wherein converting the student-generated speech into the student text in the target language is performed by speech recognition software running on the student computing devices, wherein displaying the student text to the students includes displaying, for each student whose speech is converted, a label that identifies a name of the student providing the student-generated speech, and wherein the method further comprises:

converting the stream of speech to first digital audio data;

converting the student-generated speech to second digital audio data; and storing the first digital audio data, the second digital audio data, the stream of text, and the student text together in a set of text-embedded audio files.

5. The method as in claim 4, wherein projecting the stream of text in the target language to the students and displaying the student text to the students are both performed using a projecting device, such that the projecting device displays both the stream of text from the teacher and the student text from the students substantially in real time as the teacher and the students are speaking.

6. The method as in claim 4, wherein, when converting the student-generated speech received from one of the students into the student text, a conversion error is made such that the student text does not correspond to the student-generated speech received from the student, and wherein the method further comprises repetitively receiving new student-generated speech from the student and converting the new student-generated speech to new student text until the conversion error is no longer made.

7. The method as in claim 4, further comprising the computerized device transmitting the stream of text to the student computing devices, wherein projecting the stream of text in the target language includes the student computing devices displaying the stream of text to the students.

8. The method as in claim 4, wherein, when converting the stream of speech into the stream of text in the target language, the computerized device makes a conversion error, and wherein the method further comprises repetitively receiving at least a portion of the stream of speech until the computerized device converts the portion of the stream of speech without the conversion error.

9. The method of claim 4, wherein each of a set of the students runs an Intralingual Supertitling client on a respective one of the student computing devices, wherein each Intralingual Supertitling client is coupled to an Intralingual Supertitling server running on the computerized device, and wherein each of the set of students enters a teaching session by entering the name of the student into the Intralingual Supertitling client.

10. A method of facilitating teaching of a target language, comprising:

receiving, by a microphone, a stream of teacher speech spoken by a teacher in the target language into the microphone and to students;

converting, by speech recognition software running on a computerized device coupled to the microphone, the stream of teacher speech into a stream of teacher text in the target language;

receiving streams of student speech spoken in the target language from the students;

converting the streams of student speech from the students into streams of student text in the target language;

projecting the stream of teacher text and the streams of student text together to enable the students to contemporaneously hear the stream of teacher speech, see the stream of teacher text, to hear the streams of student speech, and see the streams of student text, thereby providing a multi-sensory language learning experience for facilitating teaching of the target language to the students;

generating, by the computerized device, a transcript of a language teaching session between the teacher and the students, the transcript including the stream of teacher text and the streams of student text;

converting electrical signals carrying the stream of teacher speech from the microphone to first digital audio data;

converting the streams of student speech to second digital audio data; and storing the first digital audio data, the second digital audio data, and the converted text accumulated over the language teaching session together in a set of text-embedded audio files, the set of text-embedded audio files recording, in digital form, the stream of teacher speech synchronized with the stream of teacher text, such that when the set of text-embedded audio files are played back, the set of text-embedded audio files reproduce the stream of teacher speech and display the stream of teacher text in synchronization with the stream of teacher speech wherein projecting the streams of student text includes projecting labels that identify names of the students providing the streams of student text.

11. The method as in claim 10, wherein the set of text-embedded audio files includes both the stream of teacher text and the streams of student text.

12. The method as in claim 10, wherein, when projecting the stream of teacher text and the streams of student text, the stream of teacher text and the streams of student text are projected via a display screen set up in a classroom to enable the students in the classroom to view the stream of teacher text and the streams of student text.

13. The method as in claim 12, wherein the teacher administers the language teaching session within the classroom, and wherein, when projecting the stream of teacher text and the streams of student text, the display screen is set up in the classroom in a location above the teacher's head.

14. The method as in claim 10, further comprising the computerized device transmitting the stream of teacher text to student computing devices, wherein projecting the stream of teacher text and the streams of student text includes the student computing devices displaying the stream of teacher text to the students.

* * * * *